US010567549B2

(12) United States Patent
Lai et al.

(10) Patent No.: US 10,567,549 B2
(45) Date of Patent: Feb. 18, 2020

(54) DISTRIBUTED DATABASE TRANSACTION PROCESSING METHOD, DEVICE BASED ON GPS ATOMIC CLOCK SERVER

(71) Applicant: Beijing Baidu Netcom Science and Technology Co., Ltd., Beijing (CN)

(72) Inventors: Baohua Lai, Beijing (CN); Yukun Zhang, Beijing (CN); Long Yan, Beijing (CN); Hao Song, Beijing (CN); Yi Liu, Beijing (CN); Minghua Li, Beijing (CN); Hai Zeng, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/282,438

(22) Filed: Feb. 22, 2019

(65) Prior Publication Data
US 2019/0306274 A1 Oct. 3, 2019

(30) Foreign Application Priority Data
Apr. 2, 2018 (CN) .......................... 2018 1 0284235

(51) Int. Cl.
*G06F 15/16* (2006.01)
*H04L 29/08* (2006.01)

(52) U.S. Cl.
CPC ........ *H04L 67/327* (2013.01); *H04L 67/1097* (2013.01)

(58) Field of Classification Search
CPC . H04L 67/325; H04L 67/327; H04L 67/1097; H04W 56/001; H04W 56/003; H04W 56/004; H04W 56/0055
See application file for complete search history.

(56) References Cited

U.S. PATENT DOCUMENTS 5,263,155 A    11/1993   Wang
6,356,555 B1 *   3/2002   Rakib ................ H03M 13/256
                                                             370/441

(Continued)

FOREIGN PATENT DOCUMENTS

CN    102063055 A     5/2011
CN    102684808 A *   9/2012
(Continued)

OTHER PUBLICATIONS

Chinese Office Action for CN Application No. 2018102842356, dated May 15, 2019, 6 pages.
Search Report for CN Application No. 2018102842356, 5 pages.

*Primary Examiner* — Jonathan A Bui
(74) *Attorney, Agent, or Firm* — Patterson Thuente Pedersen, P.A.

(57) ABSTRACT

A distributed database transaction processing method and device based on a GPS atomic clock, the method includes: receiving a plurality of transaction requests by the first node server; determining a concurrency conflict between transaction requests received by the first node server; obtaining start time of each transaction in a case that the concurrency conflict exists, wherein the start time is local time of the second node server when the transaction request is sent; and local time of the second node server is synchronized with time of the GPS atomic clock server in an area which the second node server locates; processing all transactions by the first node server according to the sequence of the start time of each transaction. Throughput of distributed database system can be increased and an arrangement complexity of servers is reduced.

10 Claims, 5 Drawing Sheets

(56) References Cited

U.S. PATENT DOCUMENTS

| | | | | |
|---|---|---|---|---|
| 6,665,308 B1* | 12/2003 | Rakib | ............... | H03M 13/256 |
| | | | | 348/E7.07 |
| 7,031,344 B2* | 4/2006 | Rakib | ............... | H03M 13/256 |
| | | | | 370/479 |
| 7,069,325 B1* | 6/2006 | Lu | ............... | H04L 67/125 |
| | | | | 709/217 |
| 9,230,000 B1* | 1/2016 | Hsieh | ............... | G06F 16/2379 |
| 9,818,155 B2* | 11/2017 | Schluetter | ............... | G06Q 20/10 |
| 2001/0001616 A1* | 5/2001 | Rakib | ............... | H03M 13/256 |
| | | | | 375/259 |
| 2008/0144493 A1* | 6/2008 | Yeh | ............... | H04W 52/50 |
| | | | | 370/230 |
| 2010/0223241 A1* | 9/2010 | Hussain | ............... | G06F 1/14 |
| | | | | 707/700 |
| 2017/0289236 A1* | 10/2017 | Merchant | ............... | H04L 67/10 |

FOREIGN PATENT DOCUMENTS

| | | | |
|---|---|---|---|
| CN | 102684808 A | | 9/2012 |
| CN | 103345502 A | | 10/2013 |
| CN | 104317944 A | | 1/2015 |
| CN | 106648840 A | * | 5/2017 |
| CN | 106648840 A | | 5/2017 |

* cited by examiner

DISTRIBUTED DATABASE TRANSACTION PROCESSING METHOD, DEVICE BASED ON GPS ATOMIC CLOCK SERVER

CROSS-REFERENCE TO RELATED APPLICATIONS

This application claims priority to Chinese Patent Application No. 201810284235.6, filed on Apr. 2, 2018, and entitled "Distributed Database Transaction Processing Method, Device Based on GPS Atomic Clock Server," which is incorporated by reference in its entirety herein.

TECHNICAL FIELD

The present application relates to a field of the distributed database technology, and in particular, to the management of conflicting transactions in distributed databases.

BACKGROUND

With the rapid development of Internet business and the big data technology, the amount of data required to be concurrently processed by database systems is increasing, and data to be stored is simultaneously increasing. In order to support distributed transactions, a common approach is to generate a unique transaction ID (identity) and a timestamp for a distributed database system by using a global central transaction node. However, the central transaction node can become a bottleneck and a single point of failure in the whole distributed database system.

The above information disclosed in the background is only for enhancement of understanding of the background of the invention, and therefore it may contain information that does not constitute prior art known to those of ordinary skill in the art.

SUMMARY

A distributed database transaction processing method and device based on a Global Positioning System (GPS) atomic clock server are provided according to embodiments of the present application, so as to at least solve the above technical problems in the existing technology.

According to a first aspect of the present disclosure, a distributed database transaction processing method for execution at a first node server includes receiving a plurality of transaction requests issued from one or more second node servers, each of the one or more second node servers having a local time synchronized with a time of a Global Positioning System (GPS) atomic clock server in an area where the second node server is located, determining a plurality of conflicting transactions by detecting concurrency conflicts among transactions corresponding to the plurality of received transaction requests, obtaining a start time of each of the plurality of conflicting transactions, wherein the start time is the local time of the second node server that issued the transaction request corresponding to the conflicting transaction at the time that the transaction request was issued, and processing the conflicting transactions in a time order of the start times of the conflicting transactions.

In embodiments, the method further includes determining that a time interval between the start times of two conflicting transactions is within a time interval threshold, performing one of the two conflicting transactions, and restarting the other conflicting transaction after the time interval threshold.

In embodiments, the method includes periodically synchronizing the local time of the second node server according to the time of the GPS atomic clock server in the area where the second node server is located.

In embodiments, the method includes periodically synchronizing a time of at least one secondary time server in the area according to the time of the GPS atomic clock server in the area where the second node server is located and, periodically synchronizing the local time of the second node server according to the time of the at least one secondary time server in the area.

In embodiments, when a plurality of GPS atomic clock servers are present in the area where one of the one or more second node servers is located, the method can includes synchronizing the times of the plurality of the GPS atomic clock servers.

According to a second aspect, a distributed database transaction processing device for use at a first node server can include a receiving module configured to receive a plurality of transaction requests issued from one or more second node servers, each of the one or more second node servers having a local time synchronized with a time of a Global Positioning System (GPS) atomic clock server in an area where the second node server is located. A first determining module can be configured to determine a set of conflicting transactions by detecting a concurrency conflict among transactions corresponding to the plurality of received transaction requests. An obtaining module can be configured to obtain a start time of each of conflicting transactions among which the concurrency conflict is determined, wherein the start time is the local time of the second node server that issued the transaction request corresponding to the conflicting transaction at the time that the transaction request was issued. A processing module can be configured to process the conflicting transactions in a time order of the start time of each of the conflicting transactions.

In embodiments, a second determining module can be configured to determine that a time interval between the start times of two conflicting transactions is within a time interval threshold, perform one of the two conflicting transactions, and restart the other conflicting transaction after the time interval threshold.

In embodiments, a first synchronizing sub-module can be configured to, according to the time of the GPS atomic clock server in the area where the second node server is located, periodically synchronize the local time of the second node server.

In embodiments, a second synchronizing sub-module can be configured to, according to the time of the GPS atomic clock server in the area where the second node server is located, periodically synchronize a time of at least one secondary time server in the area, and according to the time of the at least one secondary time server in the area, periodically synchronize the local time of the second node server.

In a third aspect, a distributed database transaction processing terminal based on a GPS atomic clock server is provided according to an embodiment of the present application, the terminal includes: one or more processors; and a storage device configured for storing one or more programs, wherein the one or more programs are executed by the one or more processors to enable the one or more processors to implement the method according to the first aspect.

In a fourth aspect, A non-transitory computer-readable storage medium in which a computer program is stored, the computer program, when executed by a processor, causing the processor to execute the above distributed database transaction processing method.

Embodiments of the current disclosure provide numerous advantages or beneficial effects including: a precision of the local time of the second node server in the present application can be increased and the cost and arrangement complexity can be simultaneously considered, since the time of the second node server is synchronized with that of GPS atomic clock server. The time order of start times of the conflicting transactions received by the first node server of the present application is used as a time order to process the conflicting transactions, and the start time of each of the conflicting transactions is the local time of the second node server when issuing the transaction request of the conflicting transaction. Therefore, the transactions can be precisely processed according to the right time order of transaction requests and thus the problem of a single point or a performance bottleneck in the node server can be solved, increasing the throughput of the distributed database system.

The above summary is for the purpose of the specification only and is not intended to be limiting in any way. In addition to the illustrative aspects, embodiments, and features described above, further aspects, embodiments, and features of the present application will be readily understood by reference to the drawings and the following detailed description.

BRIEF DESCRIPTION OF THE DRAWINGS

Subject matter hereof may be more completely understood in consideration of the following detailed description of various embodiments in connection with the accompanying figures.

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present application and are not to be considered as limiting the scope of the present application.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

In the following, only certain example embodiments are described. As those skilled in the art would realize, the described embodiments may be modified in various different ways, all without departing from the spirit or scope of the present application. Accordingly, the drawings and description are to be regarded as illustrative in nature and not restrictive.

Figure 1:
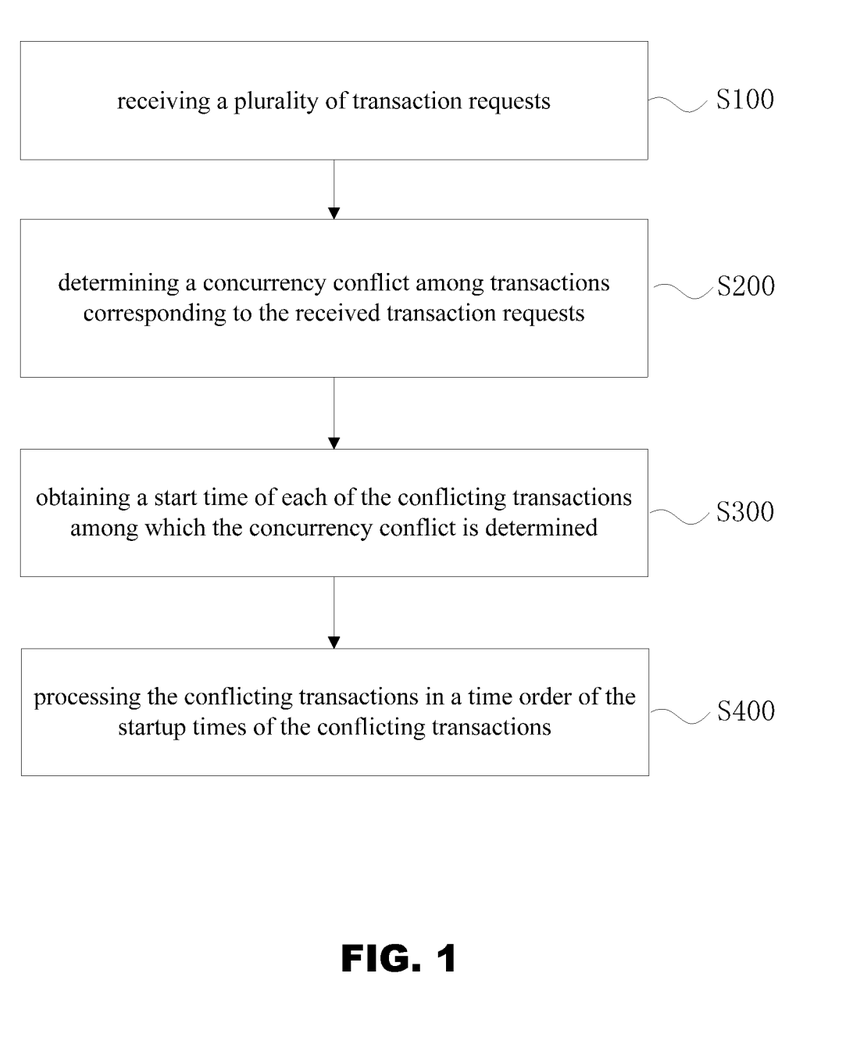
FIG. 1 is a flowchart depicting a transaction processing method, according to an embodiment.

FIG. 1 is a flowchart depicting a distributed database transaction processing method, according to an embodiment. The method can be executed, or applied to, a node server of a distributed database. A Global Positioning System (GPS) atomic clock can be provided.

As depicted and described with respect to FIG. 1, the first node server is defined as a server that receives a transaction request and a second node server is defined as a server that issues the transaction request, each of which can be referred to as a node server. The identification of the first node server and the second node server is relative. A node server used to receive a transaction request is a first node server and a node server used to issue a transaction request is a second node server. Therefore, where a node server is not indicated herein to be a first node server or a second node server, it can be understood that the node server may be either a first node server or a second node server.

At S100 a plurality of transaction requests can be received.

At S200, a concurrency conflict among transactions corresponding to the received transaction requests can be determined or detected, such that a set of conflicting transactions can be identified.

At S300, a start time of each of the conflicting transactions can be obtained. The start time of a transaction is the local time of at the second node server when the transaction request corresponding to the conflicting transaction is issued. The local time of the second node server can be synchronized with the time of a GPS atomic clock server in an area where the second node server is located.

At S400, the conflicting transactions can be processed in an order determined by the start times of the conflicting transactions. In other words, the conflicting transactions can be processed in the order of their respective start times.

It should be noted that when the second node server issues a transaction request, a start time may be generated in a data structure of the corresponding transaction. A Universally Unique Identifier (UUID) may be generated in the data structure of the transaction when the first node server receives the transaction. The plurality of transaction requests received by the first node server can be respectively issued from different second node servers. That is, there may be a transaction conflict when a plurality of transaction requests are issued by the different second node servers to the same first node server.

The local time of the second node server can be synchronized in real time with the time of the GPS atomic clock server in an area where the second node server is located, and can also be synchronized periodically with the time of the GPS atomic clock server in the area where the second node server is located. Due to the precision of the time of the GPS atomic clock server, the precision of the local time of the second node server synchronized directly with the time of the GPS atomic clock server is increased, so that an accuracy degree of the start time for the conflicting transaction is increased. Therefore, the start time for the conflicting transaction can be confirmed more accurately by the second node server used in the transaction processing.

The first node server and the second node server are relative. It can be understood, the local time of the second node server can be synchronized in real time with the time of the GPS atomic clock server in an area where the second node server is located, or can also be synchronized periodically with the time of the GPS atomic clock server in the area where the second node server is located.

One or more GPS atomic clock servers can be arranged in each area. In view of complexity and arrangement cost of GPS atomic clock servers, only one GPS atomic clock server can be provided in one area, and all of the node servers in the same area are synchronized in time with the GPS atomic clock server. Without considering the communication cost or in other application scenarios, a plurality of GPS atomic clock servers may be arranged in one area, and each node server in the same area may be synchronized in time with any one of the GPS atomic clock servers in the same area. Alternatively, each node server can be synchronized in time with the nearest GPS atomic clock server. When a plurality of GPS atomic clock servers are arranged in the same area, the times of the GPS atomic clock servers should be synchronized to ensure the precision of the local time of each node server in the same area.

In embodiments, the method can further include: determining that a time interval between the start times of two conflicting transactions is within a time interval threshold; and performing one of the two conflicting transactions and restarting the other conflicting transaction after the time interval threshold.

The time interval threshold is preset in each node server, and in embodiments a time interval threshold of 10 ms can be used. Where the time interval between the start times of two conflicting transactions is within 10 ms, one conflicting transaction may need to be restarted. The other conflicting transaction can first be performed, and then the restarted conflicting transaction can be performed. Since the interval is too short, it can be considered that two transaction requests are issued substantially simultaneously by two conflicting transactions. One of the conflicting transactions can be randomly selected to be performed before the other. Thereby, the ambiguity of the time when a transaction request is issued can be eliminated, and a time order of performing the conflicting transactions can be re-determined. Therefore, it is possible to perform the conflicting transactions in each node server of a distributed database system according to the re-determined time order.

Figure 2:
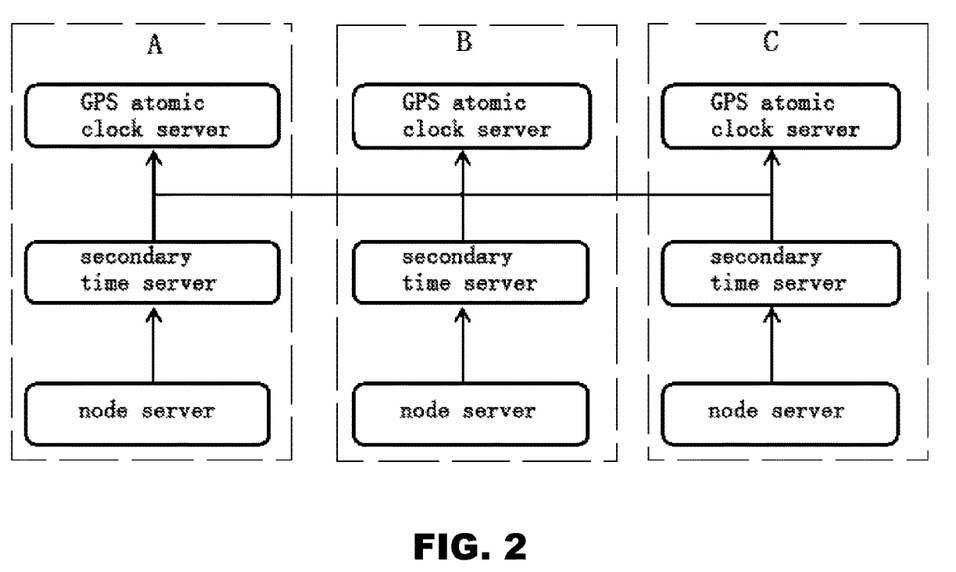
FIG. 2 is a schematic diagram depicting an arrangement for node servers and time servers in an area, according to an embodiment.

In embodiments, with reference to FIG. 2, the node servers of the distributed database system can be distributed in different areas. In addition to synchronizing times of the node servers in each area with that of the GPS atomic clock server of this area, the GPS atomic clock servers in different areas can also be synchronized in time. Thereby, the precision of the local time of each of the node servers in each area is high and the node servers can be synchronized in time to avoid a difference in start times of the transactions for corresponding to the transaction requests issued in different areas.

In embodiments, the node server is connected to the GPS atomic clock server in the area where the node server is located through a secondary time server. According to the time of GPS atomic clock server in the area where the node server is located, the time of the node server is synchronized with that of the secondary time server. According to the time of the secondary time server, the time of the node server is synchronized with that of the secondary time server.

In view of complexity and arrangement cost, only one secondary time server might be arranged in each area (shown in FIG. 2). The node servers in the each area are connected to both the GPS atomic clock servers and the secondary time server in the same area. The node servers are synchronized in time with the GPS atomic clock server or the secondary time server in the same area. For example, if the node servers are synchronized in time with the secondary time server and the secondary time server fails, the node server can be synchronized in time with the GPS atomic clock server in order to avoid affecting the processing speed of the transactions and the system throughput. Without considering the communication cost or in other application scenarios, a plurality of the secondary time servers can be arranged in the same area, the node servers can be respectively synchronized in time with any one of the secondary time servers, or the node servers can be synchronized in time with the nearest secondary time server.

In embodiments, a Network Time Protocol (NTP) can be used in the secondary time server.

In embodiments, when a plurality of secondary time servers are arranged in the same area, the secondary time servers in the area can to be synchronized in time to ensure the local time precision of each node server in the area.

In the example depicted in to FIG. 2, the node servers of the distributed database system are distributed in three areas of A, B, C. Node servers, secondary time servers and GPS atomic clock servers are all arranged in each area. Each node server is synchronized in time with the secondary time servers and the GPS atomic clock servers in the same area. GPS atomic clock servers are synchronized in clock across each of the areas of A, B, C.

In embodiments, because the node servers of the distributed database system are distributed in different areas, the secondary time servers in each of the areas can also be synchronized in time, so as to increase the time precision.

In embodiments, the data structure of a transaction at least includes a start time, a universally unique identifier and a transaction state.

The node servers in the same database cluster can be arranged in respective data centers of the areas. The secondary time server can also be arranged in the data center of an area, while the GPS atomic clock servers may not be arranged in data center of this area. Each node server can be divided into a plurality of fragmentations, and each node server can be stored with data information related to other node servers in the same database cluster.

Figure 3:
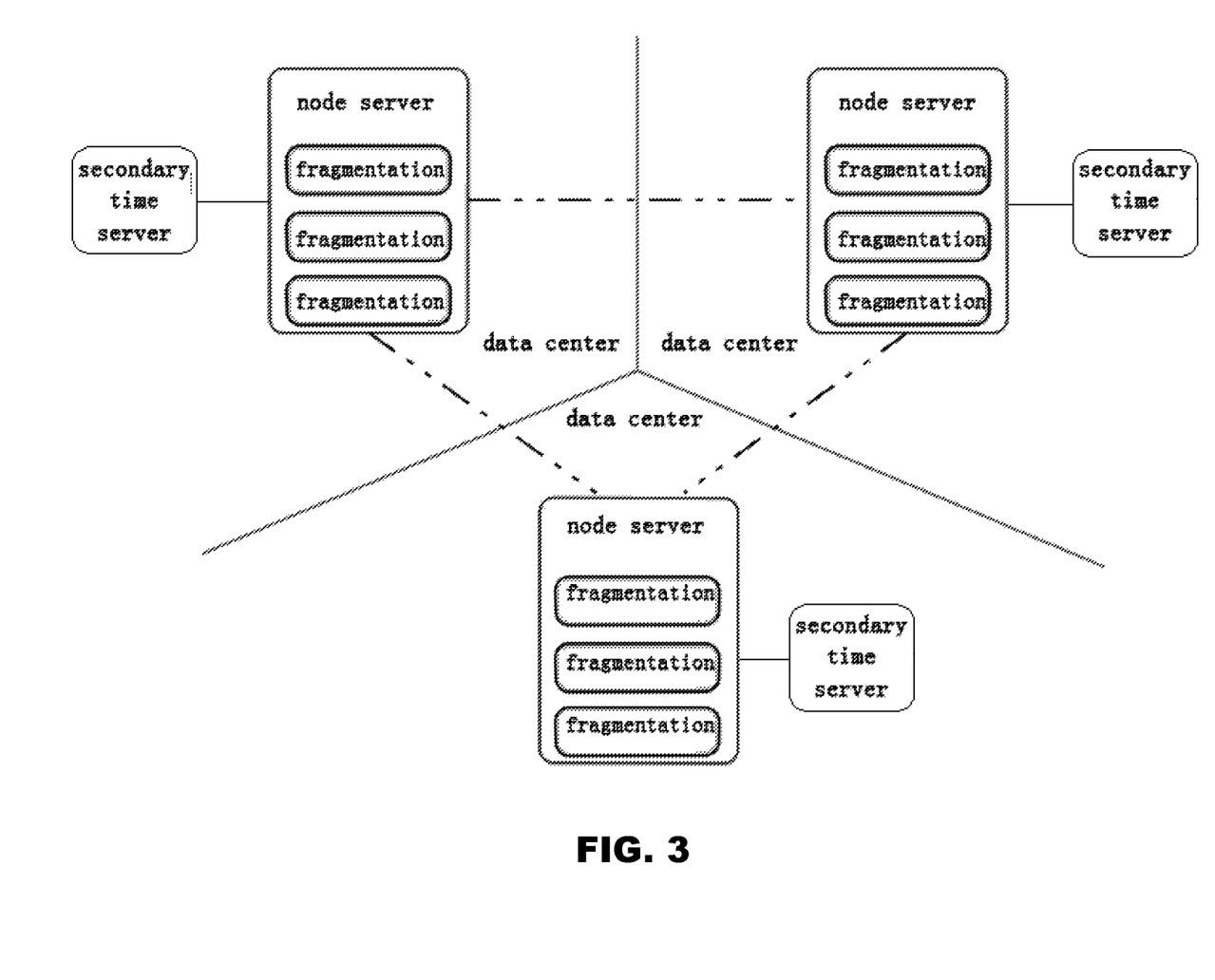
FIG. 3 is a schematic diagram depicting of arrangement for node servers, according to an embodiment.

In a particular example, with reference to FIG. 3, the database cluster includes three node servers which are arranged in three data centers respectively, and one secondary time server is arranged in each data center, wherein three fragmentations are included in each node server.

Figure 4:
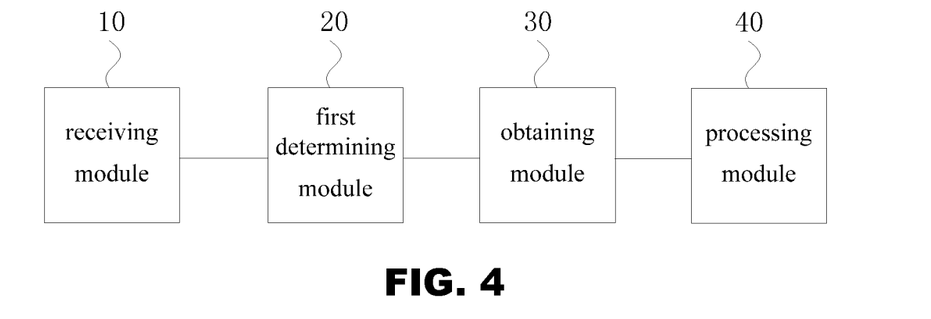
FIG. 4 is a structural schematic diagram depicting a transaction processing device, according to an embodiment.

FIG. 4 is a schematic diagram depicting a transaction processing device according to an embodiment of the present disclosure. The transaction processing device can be applied to a node server receiving a transaction request (i.e. a first node server). The transaction processing device can include a receiving module 10 configured to receive a plurality of transaction requests. A first determining module 20 can be configured to determine a concurrency conflict among transactions corresponding to the received transaction requests. An obtaining module 30 can be configured to obtain a start time of each of conflicting transactions among which the concurrency conflict is determined, wherein the start time is a local time of a second node server when issuing the transaction request of the conflicting transaction. The local time of the second node server can be synchronized with a time of the GPS atomic clock server in an area where the second node server is located. A processing module 40 can be configured to process the conflicting transactions in a time order of the start times of the conflicting transactions.

In an embodiment, the obtaining module 30 can include a first synchronizing sub-module configured to, according to the time of the GPS atomic clock server in the area where the second node server is located, periodically synchronize the local time of the second node server.

In an embodiment the obtaining module 30 can further include a second synchronizing sub-module configured to, according to the time of the GPS atomic clock server in the area where the second node server is located, periodically synchronize a time of at least one secondary time server in the area, and according to the time of the at least one secondary time server in the area, periodically synchronize the local time of the second node server.

In an embodiment the device can further include a second determining module configured to determine that a time interval between the start times of two conflicting transactions is within a time interval threshold, and perform one of the two conflicting transactions and restart the other conflicting transaction after the time interval threshold.

The first node server and the second server mentioned in this embodiment are relative and are only used to distinguish different functions of the node servers. The first node server used to issue a transaction request can also be understood as the second node server. The second node server used to receive a transaction request can also be understood as the first node server. It should not be understood and intended to limit that in the above embodiments that the first node server can only be used to receive transaction requests, and that the second node server can only be used to issue transaction requests.

Figure 5:
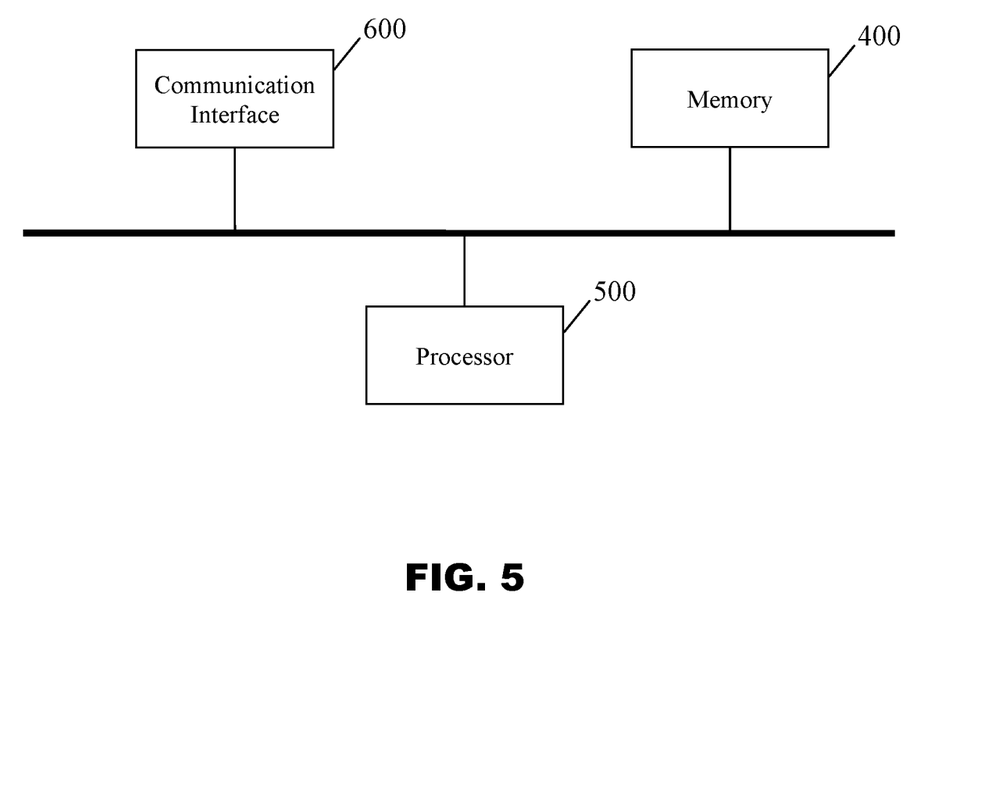
FIG. 5 is a schematic diagram depicting a transaction processing terminal, according to an embodiment.

As shown in FIG. 5, a transaction processing terminal is provided in an embodiment of the present disclosure, the terminal includes a memory 400 and a processor 500. The memory 400 can store a computer program executable on the processor 500. When the processor 500 executes the computer program, the transaction processing method in the foregoing embodiment is implemented. The number of the memory 400 and the processor 500 may be one or more. The transaction processing terminal can further include a communication interface 600 configured to communicate with an external device and exchange data.

The memory 400 may include a high-speed random access memory (RAM) and may also include a non-volatile memory, such as at least one magnetic disk memory.

If the memory 400, the processor 500, and the communication interface 600 are implemented independently, the memory 400, the processor 500, and the communication interface 600 may be connected to each other through a bus and communicate with one another. The bus may be an Industry Standard Architecture (ISA) bus, a Peripheral Component (PCI) bus, an Extended Industry Standard Component (EISA) bus, or the like. The bus may be divided into an address bus, data bus, a control bus, and the like. For ease of illustration, only one bold line is shown in FIG. 5, but it does not mean that there is only one bus or one type of bus.

Optionally, in a specific implementation, if the memory 400, the processor 500, and the communication interface 600 are integrated on one chip, the memory 400, the processor 500, and the communication interface 600 may implement mutual communication through an internal interface.

According to an embodiment of the present disclosure, a computer-readable storage medium is provided for storing computer software instructions, which include programs involved in execution of the above transaction processing method.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. A distributed database transaction processing method for execution at a first node server, the method comprising:
   receiving a plurality of transaction requests issued from one or more second node servers, each of the one or more second node servers having a local time synchronized with a time of a Global Positioning System (GPS) atomic clock server in an area where the second node server is located;
   determining a plurality of conflicting transactions by detecting concurrency conflicts among transactions corresponding to the plurality of received transaction requests;
   obtaining a start time of each of the plurality of conflicting transactions, wherein the start time is the local time of the second node server that issued the transaction request corresponding to the conflicting transaction at the time that the transaction request was issued; and
   processing the conflicting transactions in a time order of the start times of the conflicting transactions.

2. The distributed database transaction processing method of claim 1, further comprising:
   determining that a time interval between the start times of two conflicting transactions is within a time interval threshold;
   performing one of the two conflicting transactions; and
   restarting the other conflicting transaction after the time interval threshold.

3. The distributed database transaction processing method of claim 1, further comprising:
   according to the time of the GPS atomic clock server in the area where each second node server is located, periodically synchronizing the local time of the second node server.

4. The distributed database transaction processing method of claim 1, further comprising:

according to the time of the GPS atomic clock server in the area where each second node server is located, periodically synchronizing a time of at least one secondary time server in the area; and according to the time of the least one secondary time server in the area, periodically synchronizing the local time of the second node server.

5. The distributed database transaction processing method of claim 1, further comprising: when a plurality of GPS atomic clock servers are present in the area where one of the one or more second node servers is located, synchronizing the times of the plurality of the GPS atomic clock servers.

6. A distributed database transaction processing device for use at a first node server, comprising:
one or more processors; and
a storage device configured for storing one or more programs, wherein
the one or more programs are executed by the one or more processors to enable the one or more processors to implement a method comprising:
receiving a plurality of transaction requests issued from one or more second node servers, each of the one or more second node servers having a local time synchronized with a time of a Global Positioning System (GPS) atomic clock server in an area where the second node server is located;
determining a set of conflicting transactions by detecting a concurrency conflict among transactions corresponding to the plurality of received transaction requests;
obtaining a start time of each of conflicting transactions among which the concurrency conflict is determined, wherein the start time is the local time of the second node server that issued the transaction request corresponding to the conflicting transaction at the time that the transaction request was issued; and
processing the conflicting transactions in a time order of the start time of each of the conflicting transactions.

7. The distributed database transaction processing device of claim 6, wherein the one or more programs are executed by the one or more processors to implement the method further comprising:
determining that a time interval between the start times of two conflicting transactions is within a time interval threshold, perform one of the two conflicting transactions, and restart the other conflicting transaction after the time interval threshold.

8. The distributed database transaction processing device of claim 6, wherein the one or more programs are executed by the one or more processors to enable the one or more processors to implement the method further comprising:
according to the time of the GPS atomic clock server in the area where the second node server is located, periodically synchronizing the local time of the second node server.

9. The distributed database transaction processing device of claim 6, wherein the one or more programs are executed by the one or more processors to enable the one or more processors to implement the method further comprising:
according to the time of the GPS atomic clock server in the area where the second node server is located, periodically synchronizing a time of at least one secondary time server in the area; and, according to the time of the at least one secondary time server in the area, periodically synchronizing the local time of the second node server.

10. A non-transitory computer-readable storage medium in which a computer program is stored, the computer program, when executed by a processor, causing the processor to execute a method comprising:
receiving a plurality of transaction requests issued from one or more second node servers, each of the one or more second node servers having a local time synchronized with a time of a Global Positioning System (GPS) atomic clock server in an area where the second node server is located;
determining a plurality of conflicting transactions by detecting concurrency conflicts among transactions corresponding to the plurality of received transaction requests;
obtaining a start time of each of the plurality of conflicting transactions, wherein the start time is the local time of the second node server that issued the transaction request corresponding to the conflicting transaction at the time that the transaction request was issued; and
processing the conflicting transactions in a time order of the start times of the conflicting transactions.

* * * * *